United States Patent

Piaget et al.

[11] Patent Number: 5,870,425
[45] Date of Patent: Feb. 9, 1999

[54] DIFFERENTIAL RECEIVER OF DIRECT SEQUENCE SPREAD SPECTRUM SIGNALS

[75] Inventors: Bernard Piaget, Venon; Charles Fort, Vatilieu; Patrick Le Masson, Villard De Lans, all of France

[73] Assignee: Commissariat A L'Energie Atomique, Paris, France

[21] Appl. No.: 747,260

[22] Filed: Nov. 12, 1996

[30] Foreign Application Priority Data

Dec. 7, 1995 [FR] France .................................. 95 14475

[51] Int. Cl.⁶ .................................................. H04B 15/00
[52] U.S. Cl. .......................................... 375/200; 375/316
[58] Field of Search .................................. 375/200, 202, 375/206, 244, 316, 330; 370/206, 320, 347, 445, 452

[56] References Cited

U.S. PATENT DOCUMENTS 4,247,939  1/1981  Stromswold et al. .................. 375/200
5,386,435  1/1995  Cooper et al. .......................... 375/200
5,625,640  4/1997  Palmer et al. .......................... 375/202
5,712,866  1/1998  Stein et al. ............................. 375/200

FOREIGN PATENT DOCUMENTS 580243  1/1994  European Pat. Off. .
2696298  4/1994  France .

OTHER PUBLICATIONS

Patent Abstracts of Japan, vol. 95, No. 003, & JP–A–07 079176 (Mitsubishi Electric Corp.), 20 Mar. 1995.

Primary Examiner—Stephen Chin
Assistant Examiner—Joseph Roundtree
Attorney, Agent, or Firm—Pearne, Gordon, McCoy & Granger LLP

[57] ABSTRACT

A Differential receiver of direct sequence spread spectrum signals, wherein, the intermediate frequency stage comprises N filtering and amplifying channels in N separate bands. The amplification of a channel is adjusted so that the power levels delivered by the channels correspond to a predetermined power distribution law.

3 Claims, 5 Drawing Sheets

DIFFERENTIAL RECEIVER OF DIRECT SEQUENCE SPREAD SPECTRUM SIGNALS

DESCRIPTION

1. Technical Field

The present invention relates to a differential receiver of direct sequence spread spectrum signals.

2. Prior Art

The spread spectrum procedure is in use for several years in military radio communications, essentially because it makes it possible to establish discreet links, which are difficult to intercept and which resist jamming and interference. Conventionally use is made of two spreading procedures, frequency hopping spectrum spreading and direct sequence spectrum spreading.

Frequency hopping spectrum spreading is used in military applications. It consists of changing the radio carrier frequency as frequently as possible (up to several hundred times per second) according to a law only known to friendly receivers. This law, which is controlled by one or pseudorandom sequences, constitutes the access code to the link. This procedure requires the use of agile frequency synthesizers. It is therefore onerous and has but few applications in the civil field.

The other, or direct sequence spread spectrum or DSSS procedure consists of transforming the signal to be transmitted, whose spectral band is $B_S$, into a signal having the properties of a white noise, whose spectral band is much greater $B_{ES}$. This spreading operation is performed by multiplying the message to be transmitted by a pseudorandom sequence formed by its able to assume the values +1 or −1. If T is the period the information elements to be transmitted and $T_C$ the duration of a bit of the pseudorandom sequence (also known as a chip), it is possible to define a fundamental quantity of spread spectrum, modulation, namely the processing gain N, by the relation:

$$N=(T/T_C)=(B_{ES}/B_S).$$

This processing gain can vary as a function of the particular case from to several tens of thousands, the standard radiocommunications values never exceeding 1000.

In order to be able to find the information again, the receiver must perform a correlation operation between the message received and a pseudorandom sequence identical to that used for carrying out the spreading operation. Thus, the receiver must know this sequence, which contributes to the access key or code to the transmitted message. Two independent messages can be transmitted using the same frequency band and two orthogonal sequences, i.e. two sequences having low intercorrelation coefficients.

The advantages of the direct sequence spread spectrum procedure which are of the greatest significance will now be described.

The same frequency band can be shared by systems using a narrow band modulation and those using spectrum spread. The first will only notice a slight increase in ambient radio noise, because the spreading sequences have spectral characteristics of a noise, whereas the second bring about a rejection of narrow band modulations due to the correlation operation.

Several spread spectrum links can share the same frequency band by the use of orthogonal pseudorandom sequences. This procedure known as code distribution multiple access or CDMA is unfortunately difficult to implement and makes it necessary to control the transmitted power.

A spread spectrum transmission is difficult to intercept, because the receiver must know the spread sequence in order to be able to demodulate the data correctly, but in practice a partial knowledge of the sequence is often sufficient.

A spread spectrum transmission is relatively resistant to scrambling and interference, particularly when the processing gain is high. Thus, it is necessary to temper this advantage somewhat compared with a narrow band link and in the case of a civil application where account only has to be taken of interference and not badly intentioned scrambling means. Thus, by multiplying the band by N, an interception of a noise power is intercepted due to interference N times higher on average than is rejected with a processing gain equal to N, hence a resistance to such interference which is no greater than for conventional procedures.

Apart from a better control of the radio spectrum (because this procedure makes it possible to share the same frequency bands as certain narrow band transmissions), direct sequence spread spectrum would not appear to have many trumps. The vital interest of this procedure appears on analyzing the behaviour of this modulation in radio channels in the presence of multiple paths. Direct sequence spread spectrum procedures have applications in radio transmissions with motor vehicles, in local, wireless company data processing networks, data transmission in an industrial environment and more generally in all radio transmissions within buildings.

In this type of environment, the radio wave propagation takes place according to multiple paths involving reflection (on walls and partitions), diffraction (on edges) and diffusion phenomena. Moreover, in the general case, there is no direct path between the transmitter and the receiver.

This multipath propagation induces a certain number of parasitic effects, which deteriorate the quality of the transmission so as to sometimes render it unusable. Apart from the significant attenuation of the radio signal during its propagation (because it has to pass through partitions), the other prejudicial effects are:

a) The broadening of the pulse response of the channel, which is linked with the fact that all the paths have different propagation times, which imposes a limit value on the information rate in the channel. The duration of the transmitted symbol must be much higher than said pulse response width in order to obtain a reasonable error ate.

b) Fading, which is due to the destructive vector summation of the signal on the receiving antenna. Thus, the level of the signal received undergoes significant fluctuations during the displacement of the receiving antenna. These fluctuations even exist with fixed antennas. In this case they are produced by the movements of vehicles or personnel in the radio path. This fading clearly leads to a deterioration in the quality of the transmission.

The procedures conventionally used for improving this quality are so-called diversity methods, which consist of using several receiving antennas. The increase in costs resulting from the adoption of this method means that they are essentially used in military systems.

c) Doppler noise or parasitic frequency modulation, which increases as the data rate decreases. It is not a frequency shift, but a noise, because the incoming directions of the different radio paths are of a random nature. This phenomenon increases as the radio frequency and vehicle speeds rise.

In this type of radio channel, the differential phase modulation direct sequence spread spectrum method ensures a good transmission quality, provided that certain rules fixing the modulation parameters are respected.

These transmission methods are described in numerous works and articles, reference being e.g. made to "Spread Spectrum Communications" by Marvin K. SIMON et al, Computer Science Press 1983, vol. I and the following articles: "Design and experimental results for a direct sequence spread spectrum radio using differential phase shift keying modulation for indoor wireless communications", by K. KAVEHRAD et al, published in IEEE Journal on SAC, vol. SAC 5, No. 5, June 1987, pp 815–823, "Performance of differentially coherent digital communications over frequency-selective fading channels" by F. D. GARBER et al, published in IEEE Trans on Communications, vol. 36, No. 1, January 1988, pp 21–31, "Direct sequence spread spectrum with DPSK modulation and diversity for indoor wireless communications", by M. K. VAVEHRAD et al, published in IEEE Trans on Communications, vol. COM-35, No. 2, February 1987, pp 224–236.

FIG. 1 illustrates a known receiver able to process direct sequence spread spectrum signals. This receiver firstly comprises a radio frequency stage E(RF), a frequency change stage E(CF), an intermediate frequency stage E(FI) and finally a base band restoration stage E(BB).

The radio frequency stage E(RF) comprises a receiving antenna 10, a filter 12, whose band is equal to or greater than $B_{ES}$ and an amplifier 14. The frequency change stage E(CF) comprises a local oscillator 16 supplying a frequency $F_{OL}$ and a mixture 18. The latter supplies an intermediate frequency signal FI resulting from the mixing of the incident frequency and the frequency of the local oscillator 16.

The intermediate frequency stage E(FI) comprises a filter 20, whose band is equal to or greater than $B_{ES}$ and an amplifier 22, whose output 24 is connected to a gain control circuit 26 for automatically adjusting the gain of the amplifier 22 in such a way that the power of the intermediate frequency signal at the output 24 is constant.

The base band restoration stage E(BB) comprises a correlator 30 supplying on its output a signal S1 resulting from the correlation between the signal received and the spread sequence used on transmission. This stage comprises a delay line 32, which supplies a signal S2 identical to S1, but displaced by a duration equal to the period of the data elements to be transmitted. The two signals S1 and S2 are then applied to two amplifiers 34 and 36. A gain control circuit 40 regulates the gain of the amplifiers 34 and 36. As the modulation used is a phase differential modulation, the information is carried by the phase difference between the signals S1 and S2. This information is extracted with the aid of the multiplier 38. If the signal at the output of said circuit is positive, S1 and S2 are in phase, whereas if it is negative they are in phase opposition.

The base band stage also comprises a low pass filter 42, whose function is to reject the harmonics from the mixture, as well as an integrator 44. The function of this integrator is vital in the case of a multipath propagation. In this case, to each path corresponds a correlation peak in S1 and S2 and therefore each path supplies information. The integrator 44 summates all the informations carried by these paths. It therefore performs the path diversity processing operation.

The output signals of the integrator 44 are then addressed to a circuit 46 for the recovery of the clock and to two comparators 48 and 50. A data recovery circuit 52 finally supplies the data D. As in most data transmission receivers, there can also be a module for detecting and correcting transmission errors 54.

The circuit finally delivers on an output 56 the data D and on another output 58 the clock pulses H. Such a receiver circuit is described in French patent FR-A-2 696 298.

Although satisfactory in certain respects, this type of receiver suffers from disadvantages. Thus, apart from the useful or wanted signal, the receiving antenna intercepts scrambling transmissions or interference, whereof all or part of the spectrum is included in the pass band of the amplifiers of the radio frequency and intermediate frequency stages.

These disturbances can have several prejudicial effects on the operation of the receiver:

saturation of the amplifier stages, inadequate amplification of the signal by abnormal operation of the automatic gain control circuits, additive noise at the correlator output.

In the base band restoration stage, the multiplication and integration operation at the correlator output performs a pseudo-demodulation of the thus created additive noise. As a function of the disturbances, this leads to errors on the restored binary signal.

The object of the present invention is to obviate these disadvantages.

DESCRIPTION OF THE INVENTION

To this end, the invention proposes modifying the conventional intermediate frequency stage E(FI) in order to obtain a stage formed from several channels, each of the channel being responsible for processing part of the spectrum. A summating stage collects the signals produced by each of the channels in order to recompose the signal with its normal spectrum.

Consequently, each of the channels has a band filter followed by at least one adjustable gain amplifier and automatic gain control means. If P is the power delivered by the conventional intermediate frequency stage, each of the N channels i of the proposed means will supply, as a first approximation, a power $p_i$ such that $$\sum_{i=1}^{I=N} p_i = P.$$

This leads to a significant improvement in the signal to noise ratio and consequently a significant reduction in the transmission error rate resulting from interference and scrambling.

It is pointed out that the principle of using a band filter associated with an automatic gain control amplifier is already used in various electronic fields.

There are also equipments using the principle of sharing a signal over several channels with the aid of band filters, followed by a manual setting independent of the level of each channel. In this way it is e.g. possible to form multichannel analyzers. There are also circuits, where output signals of each channel are then summated in order to reconstitute a single signal, such as e.g. in a hifi equalizer.

According to the invention, simultaneously and in dynamic and automatic manner, by automatic gain control CAG, the powers $p_i$ of the signals of several bands i of the spectrum are made dependent in accordance with a predetermined power distribution law f(i), the bands then being separated with the aid of N band filters in order to then reconstitute a single power signal $$P = \sum_{i=1}^{i=N} p_i.$$

Thus, the invention falls within the field of direct sequence spread spectrum procedure, so that one of the bands contains an important disturbance and the power of its associated useful or wanted signal decreases, but the information will not be lost because it is distributed over the entire spectrum, as a result of the spreading procedure.

Therefore, the invention relates to a differential receiver of direct sequence spread spectrum signals comprising:

a radio frequency stage with reception and amplification means, a frequency change stage with means for passing from the radio frequency to an intermediate frequency, an intermediate frequency stage with filtering and amplifying means, a base band stage with correlation, differential demodulation, integration and data restoration means, said receiver being characterized in that the intermediate frequency stage comprises:

a circuit for distributing the output signal of the frequency change stage into a plurality of N identical signals, a plurality of N channels arranged in parallel, each channel having an input connected to the distribution circuit, each channel having a band pass filter with a specific band occupying part of the spectrum of the intermediate frequency signal, all of the N bands of the N filters reconstituting the spectrum of the intermediate frequency signal, following the filter, each channel also has at least one adjustable gain amplifier, means for adjusting the gain of the amplifier or amplifiers so that the amplified power $p_i$ of the channel i complies with a predetermined power distribution law, a summating circuit with N inputs, each connected to the output of one of the channels, and an output constituting the output of the intermediate frequency stage.

In a special embodiment, the distribution law f(i) is an equal distribution law, all the powers $p_i$ being the same and equal to P/N.

DETAILED DESCRIPTION OF EMBODIMENTS

Figure 1:
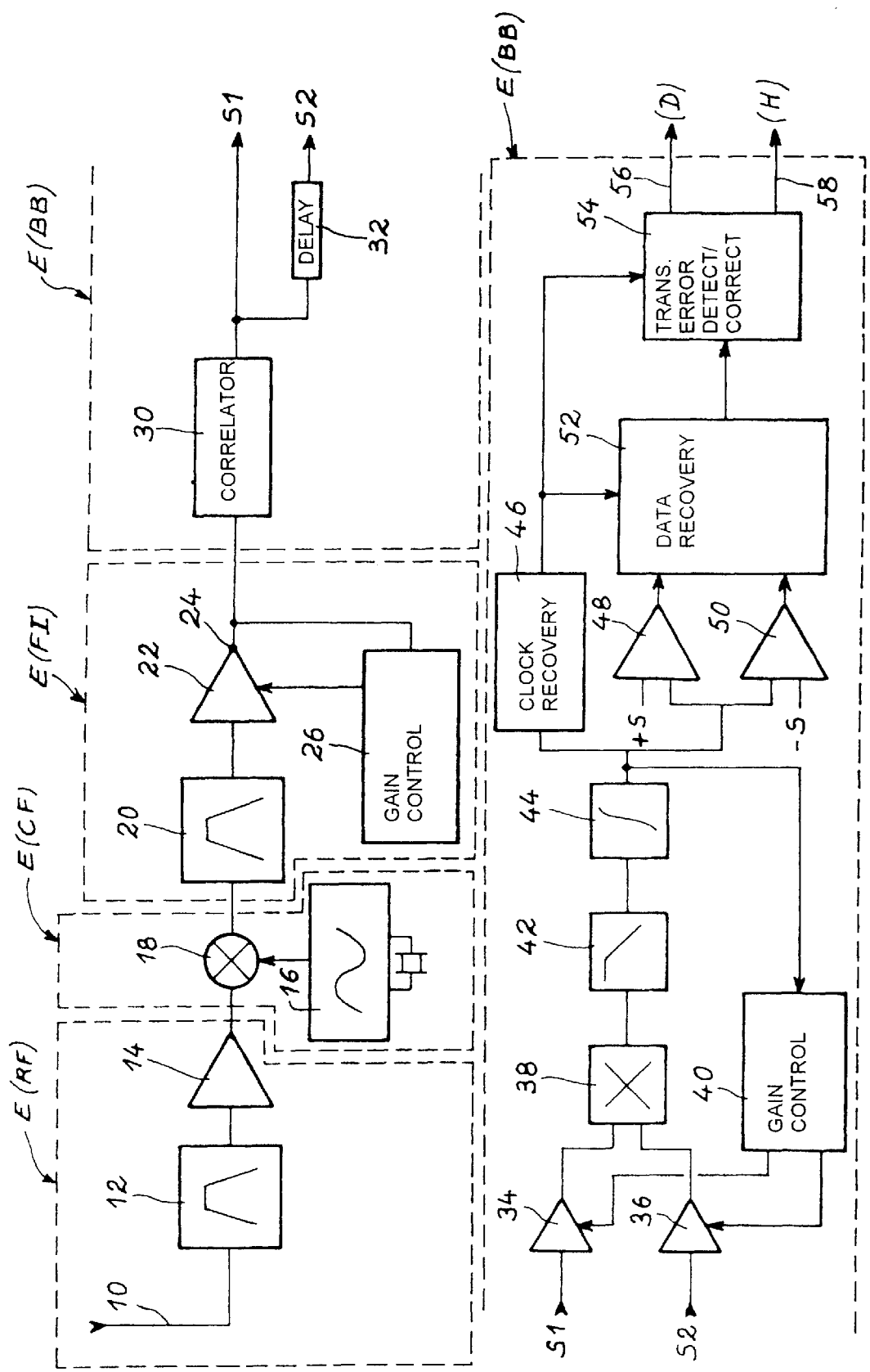
FIG. 1, already described, illustrates the block diagram of a known receiver.
Figure 2:
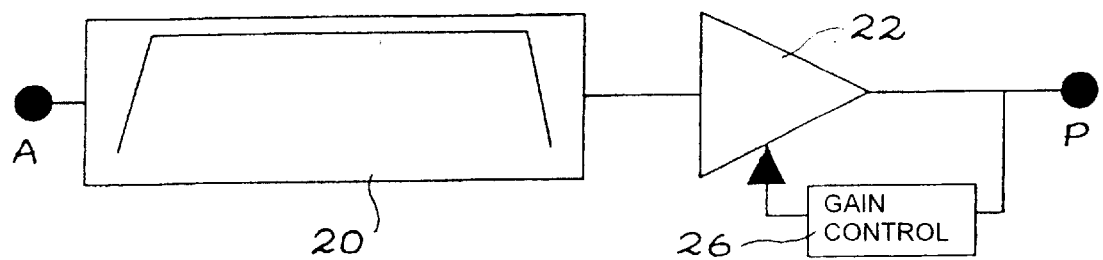
FIG. 2 shows the structure of a known intermediate frequency stage.

FIG. 2 shows the conventional circuit of an intermediate frequency stage with a band pass filter 20, an adjustable gain amplifier 22 and an automatic gain control means 26.

The filtering band of the filter 20 corresponds to the wanted signal spectrum width. The filter 20 eliminates the disturbances outside said spectrum. The amplifier gain is fixed by the power P of the filter output signal. The wanted signal and the possible disturbance contained within the pass band of the filter are amplified in the same way.

Figure 3A:
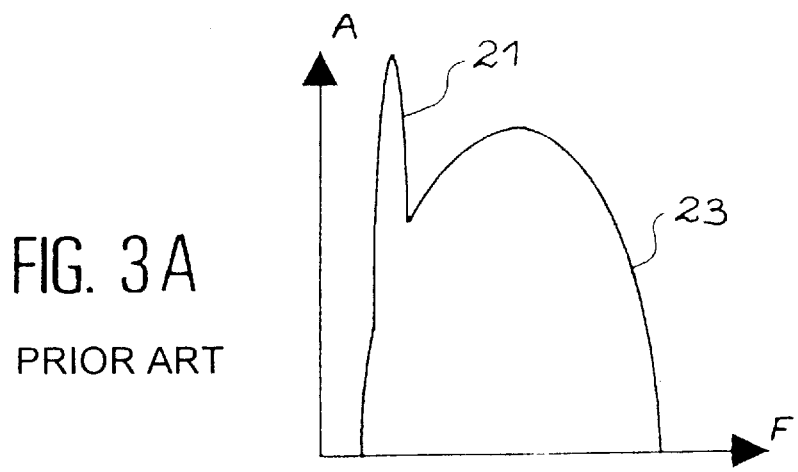
FIGS. 3A and 3B show the input signal and output signal for the preceding circuit.
Figure 3B:
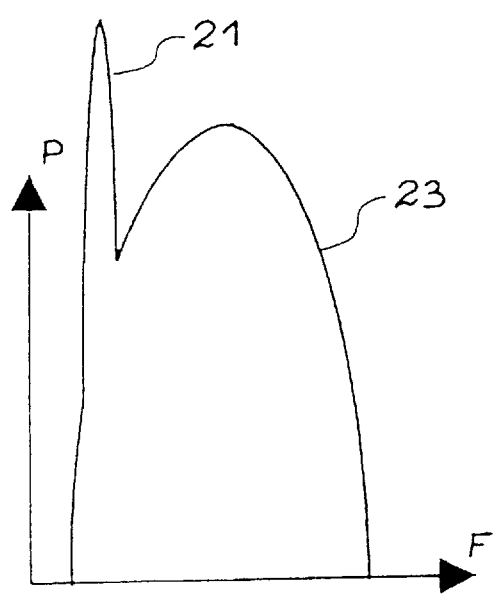

FIGS. 3A and 3B show the spectra of the input A and output P signals of the conventional circuit, in the presence of a disturbance 21 in the input signal spectrum. The disturbance 21, compared with the wanted signal 23, occurs in the same proportion at the output as at the input.

Figure 4:
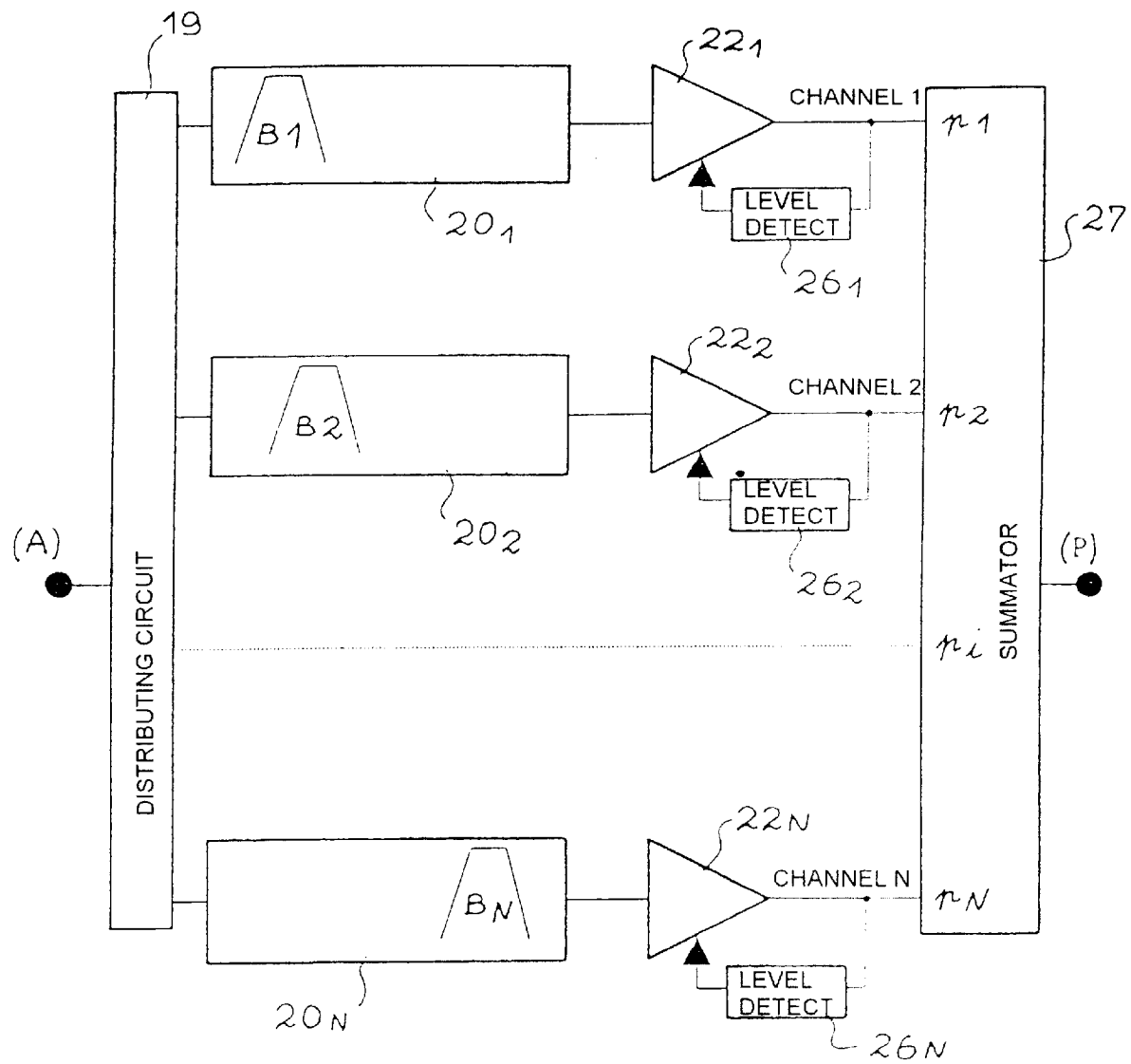
FIG. 4 shows an intermediate frequency multichannel stage according to the invention.

FIG. 4 shows the structure of the intermediate frequency stage according to the invention, which comprises a distributing circuit 19 having an input A and N outputs. This stage comprises N channels, each with a band pass filter, respectively $20_1$, $20_2$, ..., $20_N$, an adjustable gain amplifier, respectively $22_1$, $22_2$, ..., $22_N$, delivered power level detection means respectively $26_1$, $26_2$, ..., $26_N$, which are able to adjust the gain of the amplifiers so that the power delivered by each of the channels is equal to $p_i$. The circuit also comprises a summator 27 having N inputs connected to the N channels and an output delivering the total power P. The means $26_1$, $26_2$, etc. can have a reference for fixing the power $p_i$ associated with the channel i with the reference and a gain control means. In a particular embodiment, the references can be the same.

The bands of the filters $20_1$, $20_2$, ..., $20_N$ are symbolically represented in each filter under the references $B_1$, $B_2$, ..., $B_N$. It can be seen that they are mutually displaced. Together they reconstitute the total band of the spectrum of the intermediate frequency signal.

Figure 5:
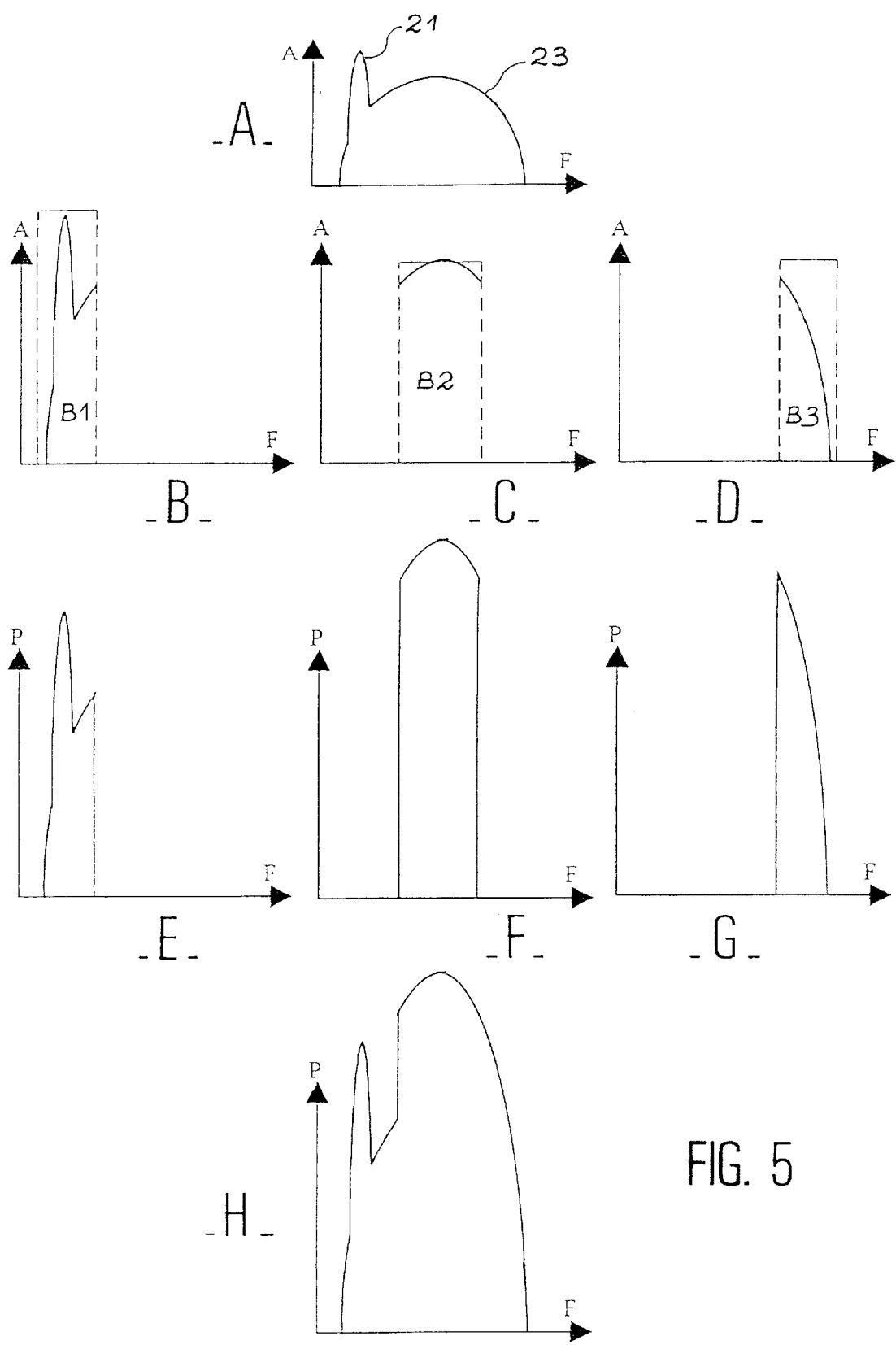
FIG. 5 shows different signal, namely the overall input signal (A), the signals in each of the filtering bands (B, C, D), the output signals of each of the channels (E, F, G) and the reconstituted output signal (H).

FIG. 5 illustrates the shapes and amplitudes of the difference signals and should be compared with FIGS. 3A and 3B concerning the prior art. FIG. 5 corresponds to the particular case where the stage only has three channels. Part A shows the input signal with a disturbance 21 and a wanted signal 23. Parts B, C and D show the signal in the three bands $B_1$, $B_2$, $B_3$ at the input of the channels. Parts E, F and G show the signals at the output from the three channels. Finally, part H shows the reconstituted signal at the summator output.

The advantage of the receiver according to the invention appears clearly on the output signal, where the disturbance proportion compared with the useful or wanted signal is reduced. This is brought about by the first channel processing that part of the spectrum where the disturbance is present. The disturbance is detected by the level detection circuit of said channel, which then reacts by decreasing the gain of the associated amplifier. Thus, at the output of said channel, there is an overall power signal equivalent to each of the signals of the two other channels. After summating the three channels, there is consequently an order of two for the undisturbed spectrum parts and an order of one for the disturbed part. The signal to noise ratio is increased, which ensures a better operation of the following stages.

Figure 6:
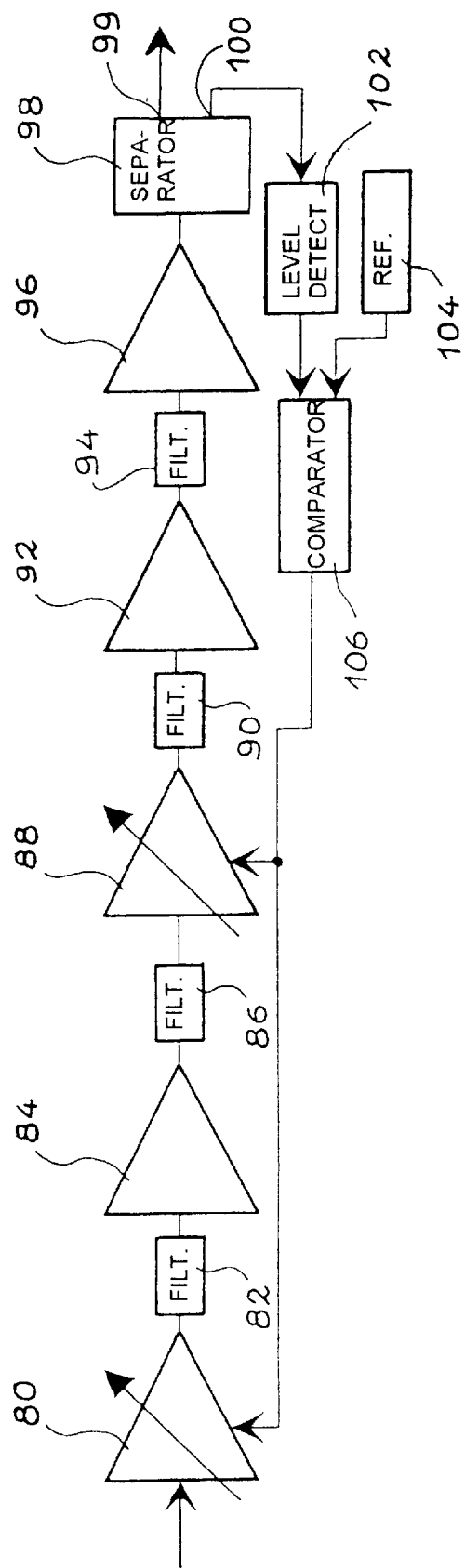
FIG. 6 shows an embodiment of a channel according to the invention.

FIG. 6 illustrates a special embodiment of a channel according to the invention. This channel comprises an adjustable gain amplifier 80, a filtering cell 82, a fixed gain amplifier 84, another filtering cell 86, another adjustable gain amplifier 88, another filtering cell 90, another fixed gain amplifier 92, a further fixed gain amplifier 96, a separator 98 having one input and two outputs, one 99 being connected to the output of the channel and the other 100 connected to the level detection circuit 102, a reference circuit 104, a comparator 106, which controls the gain of the amplifiers 80 and 88. The input of said channel is connected to an output of the separating circuit and the output of the channel is connected to the input of the summator.

The fixed gain amplifier 84 can have a gain of 12 dB and the other fixed gain amplifiers 92 and 96 gains of 22 dB. The adjustable gain amplifiers 80 and 88 can have a gain varying between −15 and 12 dB.

The amplifiers can be integrated NEC uPC 2711 circuits. The summator can be a PSC-3-1W mini-circuit. The comparator can be a LM 324 circuit. The filtering cells can be implemented by inductances and capacitors.

The applicant has produced a receiver of the described type with a signal rate of 256 kbits/s spread with sequences of 255 chips. The carrier wave frequency was 2450 MHz and the intermediate frequency 261.12 MHz.

To test the performance characteristics of a receiver according to the invention compared with a conventional receiver, the following procedure can be used. Disturbances are introduced at the input of the intermediate frequency stages, which is equivalent to an introduction at the radio frequency signal level. For example, the intermediate frequency signal is disturbed by adding an interfering signal consisting of a frequency-modulated signal (carrier successively assuming the values 220, 260 and 300 MHz, modulation depth 500 kHz, modulating frequency 20 kHz). P is the level of the maximum permissible interfering signal for a conventional receiver at the time where restoration errors appear. In the case of a receiver according to the invention, the first errors appear for an interfering signal of level P+12 dB with a carrier at 260 MHz, P+35 dB with a carrier at 300 MHz and P+38 dB with a carrier at 220 MHz.

I claim:

1. A differential receiver for direct sequence spread spectrum signals comprising:

a radio frequency stage (E(RF)) with reception (10) and amplification (14) means, a frequency change stage (E(CF)) connected to said radio frequency stage with means (16, 18) for passing from the radio frequency (RF) to an intermediate frequency (FI), said frequency change stare delivering an output signal, an intermediate frequency stage (E(FI)) with filtering and amplifying means, said intermediate frequency stage being connected to said frequency stage and delivering an intermediate signal having a spectrum, a base band stage (E(BB)) connected to said intermediate frequency stage, with correlation (30), differential demodulation (34, 36, 38, 40, 42), integration (44) and data restoration (46, 48, 50, 52, 54) means, wherein said intermediate frequency stage (E(FI)) comprises:

a dividing circuit (19) for dividing said output signal of said frequency change stage into a plurality of N identical signals, wherein N is an integer, a plurality of N channels arranged in parallel, each channel having an input connected to said dividing circuit (19), each channel having a band pass filter ($20_1$, $20_2$, ..., $20_N$) with a specific band ($B_1$, $B_2$, ..., $B_N$) occupying part of the spectrum of the intermediate frequency signal, all the N bands of n filters ($B_1$, $B_2$, ..., $B_N$) forming the spectrum of the intermediate signal, each channel also having, following said band pass filter, at least one adjustable gain amplifier ($22_1$, $22_2$, ..., $22_N$) means ($26_1$, $26_2$, ..., $26_N$) so that the amplified power ($p_i$) of the channel complies with a predetermined power distribution law (f(i)), an adding circuit (27) having N inputs, each connected to the output of one of said N channels, and an output constituting the output of the intermediate frequency stage.

2. Receiver according to claim 1, characterized in that the means ($26_1$, $26_2$, ..., $26_N$) for adjusting the gains of the amplifiers ($22_1$, $22_2$, ..., $22_N$) each comprise a level detection circuit (102), a circuit delivering a reference signal (104), a comparator (106) connected to the level detection circuit (102) and to the reference circuit (104), wherein the comparator adjusts the gain of the amplifier (80, 88).

3. Receiver according to claim 2, characterized in that the means ($26_1$, $26_2$, ..., $26_N$) for adjusting the gains of the amplifiers ($22_1$, $22_2$, ..., $22_N$) are able to equally distribute the power between all the channels.

* * * * *

UNITED STATES PATENT AND TRADEMARK OFFICE
CERTIFICATE OF CORRECTION

PATENT NO. : 5,870,425
DATED : February 9, 1999
INVENTOR(S) : Piaget et al.

It is certified that error appears in the above-indentified patent and that said Letters Patent is hereby corrected as shown below:

Column 1, Line 42, after "from" insert --10--.

Column 7, Line 32, Claim 1, delete "stare" and insert --stage--.

Signed and Sealed this

First Day of June, 1999

Attest:

Q. TODD DICKINSON

Attesting Officer

Acting Commissioner of Patents and Trademarks